United States Patent [19]

Brooks

[11] Patent Number: 5,058,051
[45] Date of Patent: Oct. 15, 1991

[54] ADDRESS REGISTER PROCESSOR SYSTEM

[75] Inventor: Timothy K. Brooks, Austin, Tex.

[73] Assignee: Texas Medical Instruments, Inc., Shertz, Tex.

[21] Appl. No.: 225,742

[22] Filed: Jul. 29, 1988

[51] Int. Cl.$^5$ ............................................. G06F 13/00
[52] U.S. Cl. ................................ 364/900; 364/968.1; 364/965.4; 364/959
[58] Field of Search ... 364/200 MS File, 900 MS File

[56] References Cited

U.S. PATENT DOCUMENTS

| | | | |
|---|---|---|---|
| 4,070,710 | 1/1978 | Sukonick et al. | 364/200 |
| 4,183,058 | 1/1980 | Taylor | 364/900 |
| 4,513,392 | 4/1985 | Shenk | 364/900 |
| 4,675,842 | 6/1987 | Szenes et al. | 364/900 |

Primary Examiner—Thomas M. Heckler
Attorney, Agent, or Firm—Arthur M. Dula

[57] ABSTRACT

A digital processing system comprising a source of input data for producing digital information, a data queue connected to the data input by a data bus, a memory array interactive with the data queue, a memory controller connected to the data queue into the memory array for timing the read/write signal cycles of the memory array in response to the state of the data queue, and a data output receiver connected by a data bus to the data queue. The data queue performs serial-to-parallel conversion of the input data from the input data source. The data queue also performs parallel-to-serial conversion on the output data to the data output receiver. The input data source comprises a large contiguous block of memory data connected to the data queue by a plurality of ports. Each of the ports is independent of any of the other ports. The data queue is a loadable shift register having a plurality of data paths extending from the input data source, the memory controller, and the data output receiver. The memory array has a data path width equivalent to the data path width of the data queue.

14 Claims, 4 Drawing Sheets

ADDRESS REGISTER PROCESSOR SYSTEM

TECHNICAL FIELD

The present invention relates to digital processing elements. More particularly, the present invention relates to digital processing elements having enlarged bandwidths for the purpose of receiving large contiguous blocks of data from multiple sources.

BACKGROUND ART

Multiple-port memory architectures are commonplace due to the current trend toward multi-processing and distributed processing. In general, such designs require at least a limited amount of shared memory for purposes of communication between processes. In such situations, the memory access time latency can increase proportionately to the number of sharing processes.

Practical memory implementation becomes progressively slower as the size of the array increases due to changes in the required technology. From fast static random access memory (SRAM), to slower but denser DRAM, to super slow magnetic or optical disc storage, the major price paid for increasing storage size is speed.

As memory densities increase, the relative system memory bandwidth deteriorates, even though the physical bandwidth may remain constant or show moderate improvement. The problem lies with practical packaging limitations which allow only a limited access to the memory elements. This hardware bottleneck prevents the use of higher density memory in applications where the decrease in package or pin count would adversely affect system bandwidth. For example: 4 1K by 8 bit memory chips used to implement a 32 bit memory application could not be replaced by a 4 k by 8 bit part without incurring a performance drop. In this case, the increased density of the part is secondary to the need for the 32 data lines.

It is an unfortunate fact that although increases in memory density have equaled or surpassed corresponding increases in logic density, the speed of practical memory arrays has not increased in proportion to the gains made in practical CPU execution cycle times. Since Von-Neuman type computers, in general, are memory intensive, due to their need for continuous instruction fetches from memory, the actual computer cycle time will approach that of the memory unless a memory design is implemented that provides a degree of leverage between CPU and memory hardware. The two most widely used techniques for increasing the memory performance are: interleaving and caching.

Leverage is usually generated through increased parallelism within the memory array itself. Interleaving is a method which allows more than one memory cycle to be active at any time by dividing the array into modules which are independently triggered by access requests. If organized to accommodate contiguous address accesses, any speed memory can appear to run at the CPU cycle speed, as long as the memory is used in a near sequential manner. A latency factor is present, however, that delays data from time of request to time of use by up to several physical CPU cycle times, and since an interleaved architecture still performs a memory cycle for each access request, multiple port implementations result in significant performance degradations.

Caches are also employed as a type of leverage device, usually in conjunction with a prefetch mechanism. The cache itself is a small to moderate size high speed memory array which provides buffering between the CPU and the main memory. An initial access by the CPU from main to memory causes the cache to generate a copy of main memory localized around the accessed location. Further accesses by the CPU will now have a high probability of coming from the cache rather than main memory, and thus the apparent speed of the memory has been improved. Additionally, the utilization of the main memory's bandwidth may increase since the interface between memory and cache runs asynchronous to the CPU's data requirements. Caches do not depend to the same degree as interleaving on the sequential nature of data accesses, however, their performance does depend on localized access of data. In addition, modification of data becomes a significant problem, particularly in a multi-processing/multiple cache architecture. The degree of cache flushing utilized in such an environment affects both the overall bandwidths of the system and, quite possibly, the operation of the software, since updated events may not become global immediately. In addition, it can be shown when data is accessed sequentially in large sets, such as video screen refreshes, the throughput rate of the cache architecture approaches that of the main memory (due to the lack of repeat accesses within a localized area).

While both interleaving and cache techniques are well accepted for general computer applications, many applications use memory in a highly predictable manner, allowing further leverage of memory bandwidth. Imaging applications provide considerable opportunity for memory bandwidth enhancement due to the large data sets typically operated as an integral unit. If an image is stored in memory as a contiguous segment of memory, only the beginning picture element (pixel) needs to be explicitly defined in order to access the total image. In such an application, algorithmic determination of future memory locations can allow multiple data words to be retrieved from the array in a single access and queued into high speed shift registers for rapid transmission. This concept has been integrated into currently available memory parts and are referred to as video RAM (VRAM).

The creation of memory architectures based on the VRAM principle allows the possibility of leveraging memory bandwidth beyond that of the cache or interleave implementations. Since multiple words can be manipulated by a single memory cycle, the memory bandwidth of a video RAM must be divided into two specifications: the memory cycle rate, which applies to random accesses into and out of the array itself, and the practical shift register input/output rate, which, while theoretically limited by the memory cycle rate, usually encounters a lower limit determined by the shift register hardware. An example is a typical 4 megabit/s VRAM with a 256 bit serial shift register. The memory cycle rate can support up to 1024 megabit/s, while an NMOS or CMOS serial shift register can support only 40-50 megabit/s. In this example, the part reaches a bandwidth limit well before the maximum memory cycle rate is achieved.

It is important to obtain memory structures that use the existing VRAM concepts, which, for graphic applications, can obtain actual bandwidths in excess of the memory parts used to implement the memory array. Bandwidth enhancement allows the use of a global memory in graphics systems which typically use distributed memory to decouple the bandwidth intensive screen refresh task from the image creation and rasterization tasks. A global memory, in turn, reduces the communication overhead between tasks, which for graphics applications can involve large data transfers (i.e., character fonts, display lists, rasterized images).

A typical graphics architectures separates the creation of an image into the following tasks: (1) the content of an image is composed of a combination of scanned imaged data and/or high level description languages; (2) the resulting image description is subjected to data compression techniques in order to reduce the amount of memory required for storage; (3) in order to display or plot the image, it is necessary to decompress the image description, and then interpret the high level description into a new description, composed of low level graphics primitives which are supported by the system hardware; (4) the graphics primitives are used to recreate the image in a bit mapped frame buffer; and (5) the completed frame buffer is used as input to the cathode ray tube (CRT) or plotter which reproduces the original image.

For maximum efficiency, the above steps are typically overlapped, allowing the display of one image while another image is being bit mapped and yet another is decompressed. To accomplish this overlapping or pipelining, distributed processing is used, with each processor operating on data generated by a previous processor. The used of distributed processing allows each hardware step to be custom designed to its intended task, mixing bit slice designs with microprocessors as needed.

Unfortunately, the use of distributed processing usually results in a distributed memory structure, so that each processing element has adequate memory bandwidth to support its associated tasks. The structure results in an overall performance degradation due to the need to transfer output data between physical memory segments.

If the above graphics system were to be implemented using a common multiple port memory, one with sufficient bandwidth to support the combined requirements of all of the distributed processes, the overhead necessary for intertask communications would be drastically reduced. Instead of transferring large data sets between memory sets, only memory pointers need be communicated, identifying the beginning of a contiguous block of data.

It is an object of the present invention to enhance the ability of a digital processing system to transfer large data sets between memory elements at reduced overhead.

It is an other object of the present invention to provide a digital processing system that allows data in the shift register to be transferred at a rate well above that of the memory array.

It is still a further object of the present invention to provide a digital processing system that enhances the ability of graphic systems to capture data, to store data, and to reproduce the original image data.

These and other objects and advantages of the present invention will become apparent from a reading of the attached specification and appended claims.

SUMMARY OF THE INVENTION

The address register processor system of the present invention is a digital processing element which performs a function equivalent to a generic digital memory element. Address and timing control input signals are used to store or retrieve data from the address register processor in a manner analogous to a typical dynamic or static RAM array. Internal to the address register processor, however, the actual logic used to accomplish the storage function differs considerably from a normal memory. In fact, the address register processor system can be viewed as an additional logic layer above that of fundamental memory logic, since any address register processor implementation, by necessity, uses a normal memory element for physical storage. The additional logic layer within an address register processor element allows the address register processor memory bandwidth to become a function of memory addressing sequence. As successive memory accesses become more substantial, the available bandwidth can increase well beyond the bandwidth of the individual memory IC's used to implement the address register processor's memory array.

The necessary modules of the address register processor system of the present invention are: (1) a data queue; (2) a memory controller; and (3) a memory array. The data queue provides the buffering of data between the external data bus and the internal memory array. The data queue also performs a serial-to-parallel conversion on input data, and a parallel-to-serial conversion on output data. The memory controller times the memory array read/write cycles dependent on the state of the data queue and the current external memory address. The memory array provides a data path width equivalent to the internal data path width of the data queue.

The data queue is the most important element. The data queue can be decomposed into more fundamental logic structures. The data queue comprises a loadable shift register utilizing four data paths. The serial input and output of the shift register provide the external port data bus, while the parallel input and output, after being buffered by registers, form the internal memory data bus.

In operation, input data is written into the shift register via the serial input. As successive data is input, the memory controller compares the data address to the previous address and also maintains a count of data shifted into the queue since the last internal memory cycle. When the queue is full, or if the memory address ceases being sequential, the memory controller transfers the queue contents to the write register, and schedules an internal memory cycle to be performed. Once the shift register has been transferred, data input can continue. As long as the scheduled memory write is completed prior to the next necessary shift register transfer, the external data bus operates at a rate independent of the internal memory cycle rate.

Data output is analogous. An external data read request causes the memory controller to schedule an internal memory read cycle which, when executed, loads the read register with the requested data, along with additional data stored sequentially around the requested data. The contents of the read register are loaded to the shift register whenever the last valid data is shifted out, under control of the memory controller, allowing the read buffer to act as a virtual extension to the shift register. Only when the read buffer is transferred to the shift register does the memory controller need to perform another memory read.

The effectiveness of the data queue is related to the character of the external data stream. Sequentially located data allows maximum efficiency of the queue, whereas randomly located data precludes any bandwidth leverage from the data queue, since each external data cycle requires an internal memory cycle.

The address register processor system of the present invention, as a memory element, has two unique features when compared to existing memory elements. First, under the address register processor system, the memory bandwidth is a function of address sequence. Although the same effective bandwidth leverages can be achieved using interleaving schemes, the address register processor architecture can provide more deterministic external transfer bandwidths, making it preferable in applications which must be fully deterministic. Secondly, multiple porting with the address register processor system is inherent. Because the address register processor system disassociates external data transfers from internal memory cycles, it is possible to design a multiple port address register processor with no interaction between ports. As long as the instantaneous internal memory bandwidth is never exceeded, no port arbitration delay or data path delay is added to any port, regardless of the number of physical ports sharing the internal memory array.

The address register processor system performs best during the transfer of large contiguous blocks of memory data. This is because the address register processor principle depends on sequentially organized data to achieve memory bandwidth multiplication. In particular, the present invention is most useful in connection with data inputs from video raster buffers, imaging processor memories, memory cache interfaces, and virtual memory buffers (disc or tape drive). In addition to the usefulness of the address register processor in each of the previously stated applications, the multiporting capabilities of the address register processor make it an ideal choice when more than one of these applications are present in the same design (i.e., image processor with both a hard disc interface and a video raster buffer). Since the address register processor's efficiency is maximized for these diverse functions, the address register processor can serve as a global memory, eliminating the need for individual disc and raster physical buffers.

DETAILED DESCRIPTION OF THE INVENTION

The address register processor (ARP) architecture was developed to accomplish the following goals: (1) provide multiple port read/write access to a common memory; (2) provide fully asynchronous operation between ports; (3) provide address generation assistance to ports without immediate addressing capabilities; (4) provide a port interface easily implemented in hardware; (5) provide deterministic operation for specific ports (i.e. video refresh); and (6) achieve continuous port bandwidth capability beyond the bandwidth of the individual memory chips.

Many of the above-stated goals are required of multiple port memories in general; however, the requirements for address generation and apparent bandwidth enhancement are quite unique and indeed drive the ultimate architectural design. In the description of the best mode for carrying out the invention, the following element definitions are important:

1. ARP (Address Register Processor)—Refers to the memory architecture as a system element.
2. Attached Resource—A system element external to the ARP which uses the ARP to store or retrieve data.
3. Memory Port—The hardware interfacing the memory array to an attached resource.
4. Port Queue—A serial shift register, located in each memory port, used for temporary data storage during port data transfers.
5. Write Register—A pipeline register, located in each memory port, used to hold data prior to transfer to the memory array.
6. Read Register—A pipeline register, or latch, located in each memory port used to hold data from the memory array, prior to transfer to the port queue.
7. Data Word—The unspecified size of the data operand transferred over a memory port in a single cycle.
8. Data Set—A number of data words (equal to the port queue size) which are located at a single physical memory address.

A typical memory architecture allows a direct path between the memory's address and data bus structure, and that of the connected attached resource. An ARP architecture, however, isolates the physical memory array data and address bus from all attached resources. This isolation allows the ARP to perform bandwidth enhancement on the data bus or providing address processing capability for the address bus. The mechanisms used to accomplish these functions can be analyzed from the system block diagram illustrated in FIG. 1.

Figure 1:
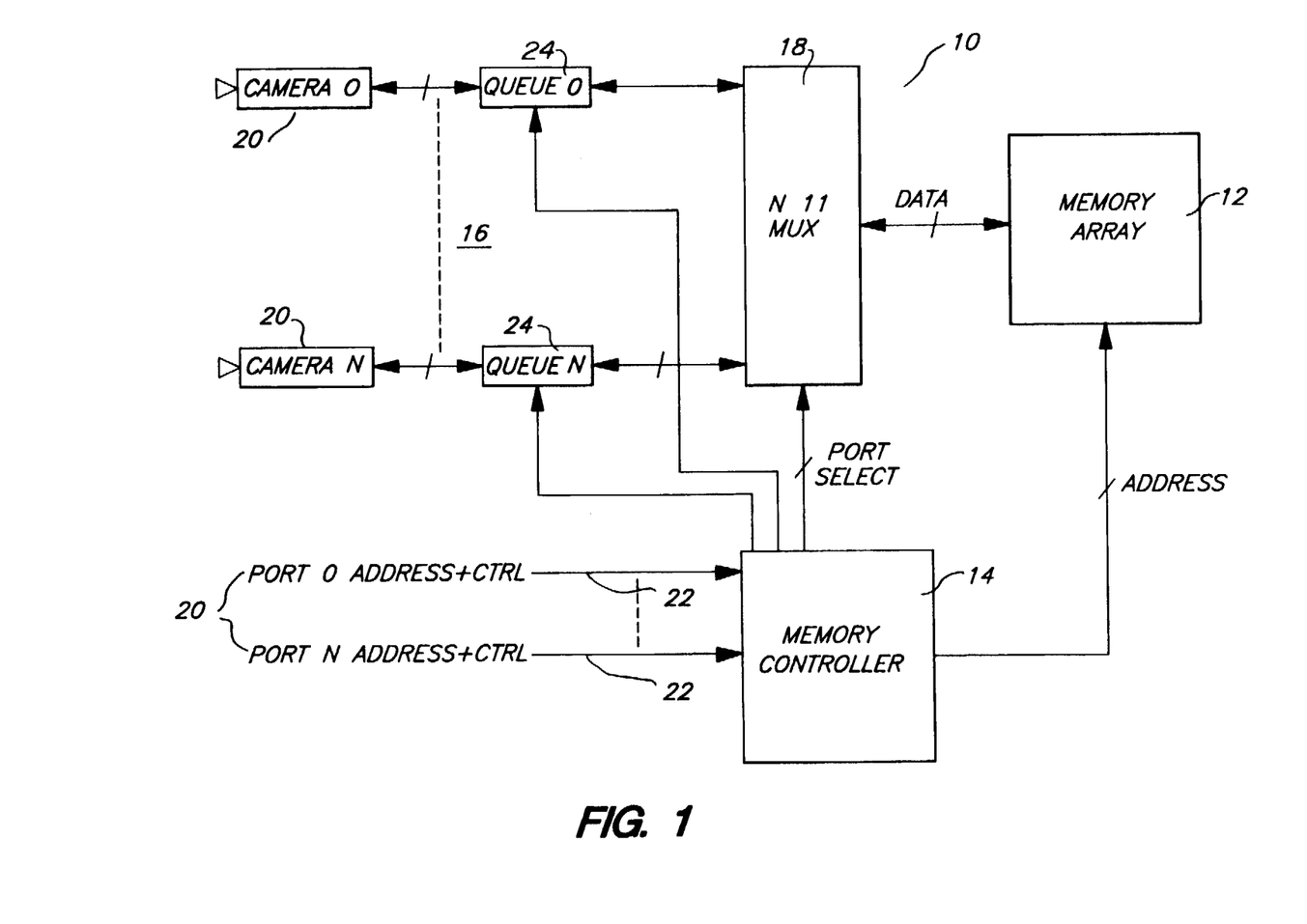
FIG. 1 is a block diagram of the address register processor system's architecture.

A block diagram of a multi-port ARP memory is shown in FIG. 1. The memory structure 10 comprises four functional elements: the memory array 12, the memory controller 14, the data queue 16, and a port multiplexer 18.

The memory array 12 of the address register processor system 10 operates identically to that of a normal memory array. In the case of a dynamic random access memory (DRAM) implementation, read and write cycles are performed by presenting a multiplexed address (row/column) to all elements of the array, while transferring data using a write line to control the direction of the transfer. The exceptional character of the array comes entirely from the width of its data path. An ARP memory array transfers data only in data sets equal to the port data word size multiplied by the port queue size. In the case of a 16 bit data word and an 8 word deep port queue, the memory array width is 128 bits. The architecture of the memory array 12 is essential to the ARP's ability to meet the design goal of bandwidth enhancement.

The ARP memory controller 14 performs all of the functions of a typical memory controller. It sequences the memory cycle within the array by asserting the control lines which latch addresses within the memory elements and control the direction of the data transfers. It also provides the multiplexing of physical addresses into row and column components for DRAM and provides the arbitration logic required to generate necessary refresh cycles. In the case of multiple port designs, the memory controller 14 directs the data transfers to the appropriates ports and manages the operation of the port multiplexer 18.

In addition to these normal controller functions, the ARP memory controller 14 is capable of performing an address translation function based on an instruction set unique to each attached resource 20. The instructions are passed from the attached resource 20 to the ARP system over a common instruction bus 22 controlled by the memory controller 14 via the common acknowledge bus. The memory controller 14 is primarily responsible for the ARP's ability to meet the design goals of multiple porting, and address generation support.

The data queue 16 is the most distinguishing architectural element in the ARP system 10, and the element responsible for the dramatic performance capability of the architecture 10 as a whole. While maintaining support of random access cycles, the port queue 24 and related pipeline registers provide the ability to support an aggregate port bandwidth which is a multiple of the bandwidth available from each individual memory element. The operation of the data queue 16 relies on the knowledge that port accesses are performed on large data field which are, for the most part, sequential in nature. This premise is valid for many applications, imaging and array processing being prime examples.

Figure 2:
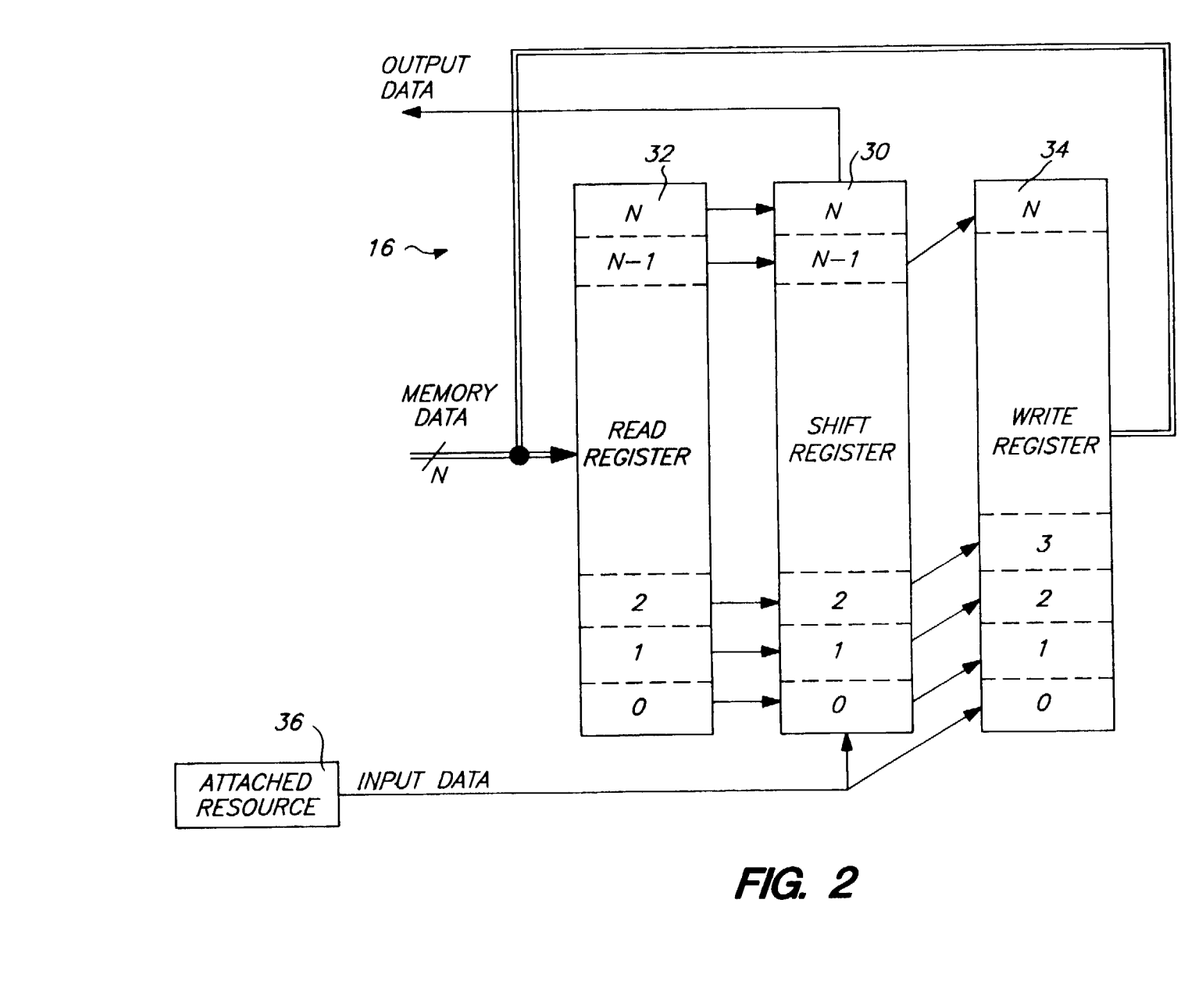
FIG. 2 is a block diagram illustrating the data queue of the address register processor of the present invention.

Referring to FIG. 2, the data queue comprise a port queue 30, plus read pipeline register 32 and write pipeline register 34. In operation, the attached resource 36 controls the filling and/or emptying of the port queue 30, while the memory controller 14, acting on instructions from the attached resource 36, acts on data in the pipeline registers 32 and 34. As shown in the timing diagram of FIG. 3, the attached resource times the data transfer between port queue 30 and pipeline registers 32 and 34 by asserting SRO during the final data transfer into the port queue 30. This separation of control allows the attached resource 36 to complete control over the port data transfer cycle at all times, and allows the memory controller 14 the same degree of control over memory bus transfers. This queue element 16 is largely responsible for the architecture's ability to meet the design goal of a synchronousity between ports and bandwidth enhancement.

Referring to FIG. 1, the ARP port multiplexer 18 is equivalent to a data multiplexer in a typical multiple port memory architecture. Implemented as a bus structure, the multiplexing function is performed by the memory controller 14 as it selectively allows either the memory array 12 or a specific port to control the memory data bus, without bus contention. As in the case of the memory array itself, a distinguishing feature of the multiplexer architecture 18 is its requirement to control a significantly larger number of data lines than a normal memory structure; a number determined by the port queue size times the port data word size.

Implemented in its simplest form the multiplexer 18 performs an important but mundane task which does not by itself contribute to the performance of the architecture 10. More elaborate bus management functions are possible, however, such as data set barrel shifting and reversion which, when implemented in the multiplexer 18, can dramatically increase the performance of the ARP memory. In the case of random access operations, for example, the ability to barrel shift any data word to the top of the port queue increases the throughput of the port significantly under partial queue usage conditions.

The typical flow of a data transfer between the ARP 10 and attached resource 10 comprises three logical steps: (1) generate a service request to the ARP, (2) insert and/or extract data from the queue 16, and (3) wait for the completion of the requested service routine (handshaking). This sequence continues until all the required data has been transferred.

Implicit in the above logic is the pipelined character of the data transfer. Information stored into the queue is stored into memory by the service routine requested during the following transfer cycle. Similarly, data retrieved from the queue needs to be read from memory by the service routine of the previous cycle. The effect of the skew between address and data is that an initial cycle is required prior to reading valid data, and an extra service request is required after the last queue write.

Each transfer cycle starts when the attached resource asserts a momentary request for service by asserting the SRQ and DCK port signals. This signals the termination of the current data set transfer between the attached resource and the port queue. This request cause the following events to occur simultaneously: (1) a port unique prioritized interrupt is asserted and latched within the ARP's interrupt handler logic; (2) the instruction defining the service routine to be executed is latched within the attached resource, pending transfer to the ARP at a later time; (3) the present contents of the queue are stored in the write register 34 for possible insertion into internal computer memory; and (4) the queue is reloaded from the ARP's read register 32 which contains data previously read from memory. At this point, the attached resource is ready to begin its next port queue transfer cycle.

Figure 3:
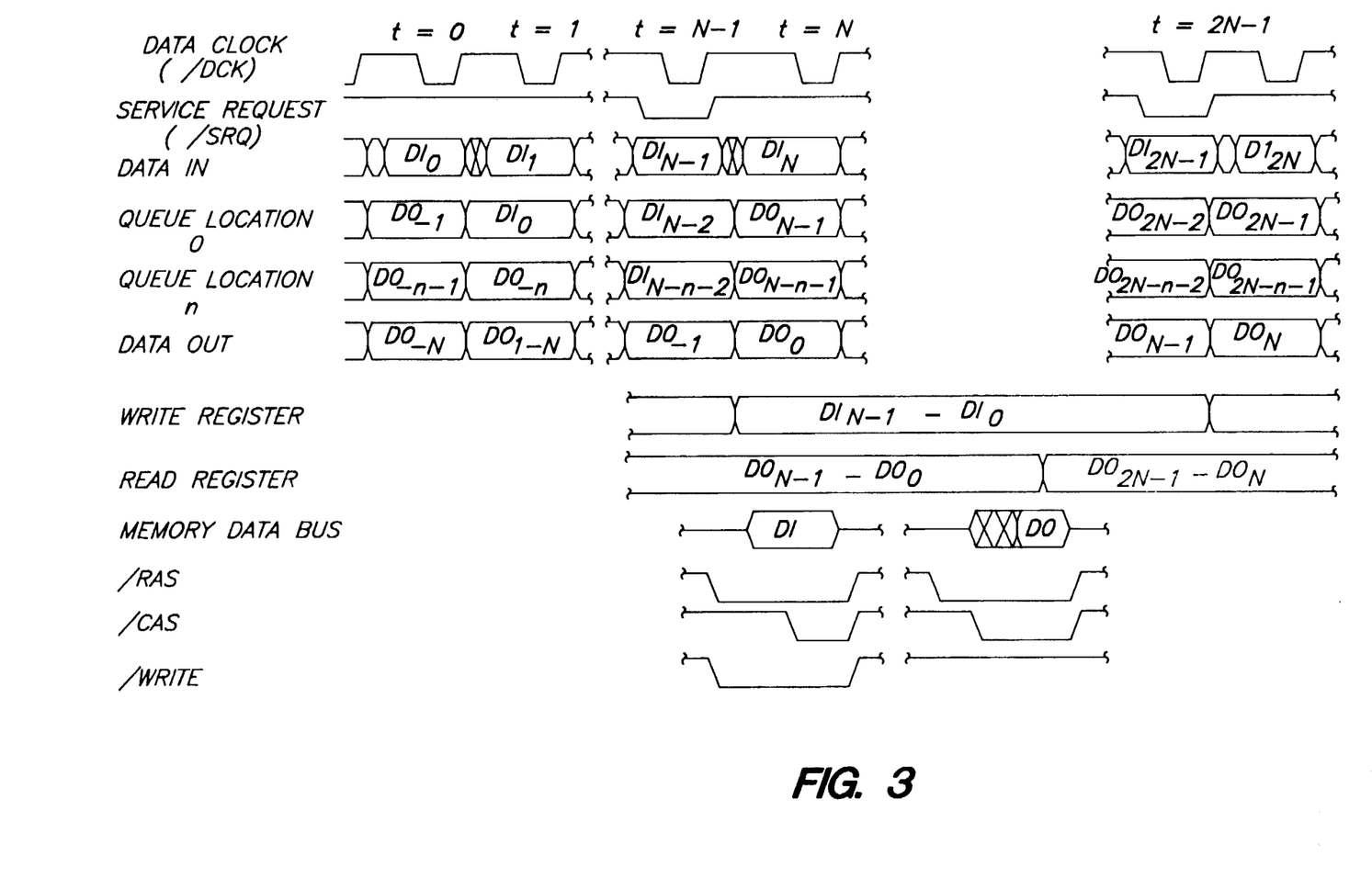
FIG. 3 illustrates, in graphical fashion, the actual timing of the operations of the address register processor of the present invention.

All data transferred between the ARP and the attached resource passes through the port queue 30 which is implemented as a synchronous shift register. The attached resource 36 controls the transfer of data by asserting a clock line (DCK) which is unique to each port. Data being input to the ARP is clocked into the first location of the queue, and data being retrieved is accessed from the last location. In the case of simultaneous read/write port operations, data clocked out of the queue is replaced by incoming data sychronously, allowing the queue to start the cycle completely full of output data and end the cycle full of input data. The timing diagram of FIG. 3 shows the exact sequence.

Although the depth of the queue is a critical issue from a performance perspective, no restriction is made concerning queue usage during a general data transfer cycle. Any amount of data, up to the queue depth, can be moved during a data transfer cycle. The service routine then becomes responsible for performing any necessary masking of invalid queue location.

Functionally, the handshake operation maintains the one-to-one correspondence between service interrupts and queue transfers by preventing the data path cycle rate from exceeding the address path cycle rate. The handshake between the data and address path is implicit for all ports, although many applications need not require a hardware implementation.

To provide for cases where the worst case interrupt service latency exceeds the queue maintenance cycle, the ARP generates IACK signals, which, when combined with the priority acknowledge level currently in effect, specifies the next port to be serviced. Each port can monitor IACK, qualified by its unique priority level and determine when it is safe to resume data transfers. If the port's priority is high enough to guarantee execution of its service request in time, regardless of other port requests, the handshaking function is not required. This special case is an important feature of the architecture, since in the case of certain system elements, data flow must be completely deterministic, without delays of any kind.

The address path of the ARP architecture accomplishes the transformation of port instructions into a sequence of memory cycles or memory address manipulations. The address path is comprised of two distinct processes: (1) the interrupt handler; and (2) the instruction execution unit.

The interrupt handler, implemented entirely in hardware, performs the following tasks; (1) generates individual latched interrupt requests from momentary port service requests; (2) prioritizes the pending interrupts; (3) arbitrates the port common instruction bus, allowing only one port to provide instructions during any interrupt acknowledge cycle; (4) transforms port instructions into physical vectors for use by the instruction execution units; (5) provides interrupt acknowledge logic to reset accepted interrupts and accomplish port handshaking; and (6) localizes metastable effects using a combination of hardware and software design rules.

In operation, the interrupt handler samples all pending interrupts at a rate equal to and sychronous with the ARP's memory cycle rate. The sample is prioritized and the selected priority (unique to each port) is broadcast to all ports over the priority acknowledge bus. The selected port asserts its instruction on the common instruction bus until it is either accepted for execution, or deselected by the prioritization logic. The asserted instruction is combined with the port priority and remapped to provide a unique vector used by the execution unit as a service routine entry point.

When the execution unit accepts a new vector, the interrupt handler resets the selected interrupt and issues an IACK signal which, when combined with the present priority, specifies which port's instruction is being executed. The port can decode this information to effect a handshake either at the start of the service routine, or at the conclusion of the service routine.

From a performance standpoint, the interrupt handler by operating in parallel with the memory cycle logic, does not use any memory bandwidth. A new instruction entry point is produced every memory cycle, allowing a port switch every cycle if necessary. The interrupt handler, does, however, impact ARP performance by contributing to the execution latency of the address path as observed from any single port. This latency is created by two mechanisms: the interrupt sampling method and the interrupt prioritization scheme.

The average latency period between the latching of the interrupt and the first sampling of it equals one-half the sampling period plus any sampling set up time requirement because interrupts are sampled from asynchronous sources. In the case of the ARP, this latency is one-half of a memory cycle. In addition, the time required to transfer the interrupt into a usable entry point is exactly one memory cycle, making the average hardware latency one and one-half memory cycles.

Additional application dependent latency is introduced by the type of prioritization scheme implemented. In the case of hardwired priority levels, the latency introduced decreases as the priority assigned to the port increases but never decreases below the most lengthy instruction executed within the execution unit, since the last instruction must always complete before accepting a new interrupt. This method has the advantage of allowing very high priority ports to execute without wait states since the maximum interrupt latency can be easily calculated and controlled to be less than the data transfer cycle. The disadvantage, however, is that low priority ports can become extremely undeterministic, since they may never achieve top priority during heavy usage periods. An alternative priority scheme dynamically assigns priority to the port with the fullest queue, and therefore, most in need of service. This method minimizes the wait states of all ports equally, but loses the capability of fully deterministic operation on any port. In addition, the hardware implementation is considerably more complicated than for hardwired priorities.

The interrupt handler is designed to be the point in the ARP where asynchronousity, and therefore metastability, between ports, is handled. In general, all events leading up to and including latching of a port interrupt request are completely controlled by the attached resource 36, and all events following acceptance of the interrupt are timed by the ARP control logic up to and nincluding negating the interrupt. The process of initial andsampling of a newly latched interrupt has a metastable probability, however, since the ARP logic performs a synchronous sampling of asynchronous interrupts, and input setup times cannot be guaranteed. By localizing the metastability issue to this single area, ARP designs can dedicate specific hardware (redundant sampling, or averaging) to this problem and efficiently minimize its effect on the system's reliability.

The instruction execution unit converts port instructions into physical memory operations, thereby controlling much of the ARP's hardware. The complexity of this operation is not strictly defined, but the unit does require the following elements. First, the unit requires an instruction sequencer. The instruction sequencer allows the execution unit to operate as an interrupt driven resource using entry point vectors. The instruction sequencer is most suited to a bit slice, microcoded implementation, although certain application could use a hardwired state machine. Secondly, an operating system is required. In the case of microcoded implementations, any efficient operating system is desirable to achieve flexibility of operation while maintaining acceptable interrupt response time. Thirdly, an address generation element, as simple as a counter, can be used to sequentially access memory locations. It can also be as complicated as a processor capable of performing exotic algorithms. However complicated, this element is under direct control of the instruction sequencer. Fourthly, a memory controller 14 is required to provide the physical timing signals to the memory array 12 and to distinguish between memory reads and writes. Also under sequencer control, the memory controller 14 needs to operate autonomously once initiated, in order to maintain the pipelined character of the execution unit as a whole. Lastly, a port selector is required to manage the memory data bus, which in a multiple port design may have many possible bus masters. This resource is managed by the memory controller 14.

The degree of complexity within each of the above elements is application specific and is pertinent to the ARP architecture itself only in the area of performance. It is, in fact, possible to achieve the ARP memory concept while having each port submit an immediate physical memory address for each desired access. Such a design would all but eliminate address processing within the ARP, while maintaining the full bandwidth leverage generated by the data path hardware. The existence of a powerful execution unit, however, extends the capability of the ARP beyond that of a simple memory element. With complex address generation capability, the ARP becomes a powerful data movement processor, accomplishing many of the high data bandwidth tasks that most general purpose processors find impossible.

Figure 4:
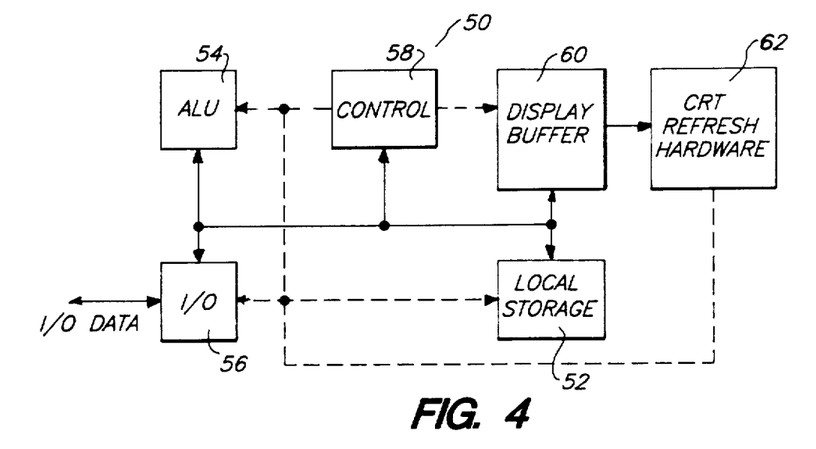
FIG. 4 is a block diagram showing the application of the address register processor of the present invention.

Referring to FIG. 4, a digital computer 50 is shown as using the ARP system of the present invention. Digital computer 50 is composed of four functional elements: a storage unit 52, an arithmetic logic unit 54, an input/output unit 56, and a control unit 58. The distribution and interconnection of these elements determine the computer's ability to perform application specific tasks.

The display buffer, or ARP 60, when used in partial or total fulfillment of the storage function, can provide a substantial performance increase over a standard dynamic RAM implementation for many graphics or video applications. In a single processor environment, the ARP can drastically reduce the memory bandwidth bottleneck between processor 54 and the input/output units 56. In a multiprocessing environment, the ARP provides the added benefit of straight forward multiporting, easing the control unit's task of arbitrating the common resource portion of the storage unit between processors.

The use of the ARP structure in a typical single processor graphic system is shown in FIG. 4. In this case, the ARP 60 provides a buffer function between the image creation task, and the high bandwidth screen refresh task. The unique characteristics of the ARP can allow both tasks to access data simultaneously, and can guarantee the refresh task completely deterministic (no wait state) operation at data rates far exceeding the bandwidth of the DRAM memory chips used to implement the actual buffer memory array.

Figure 5:
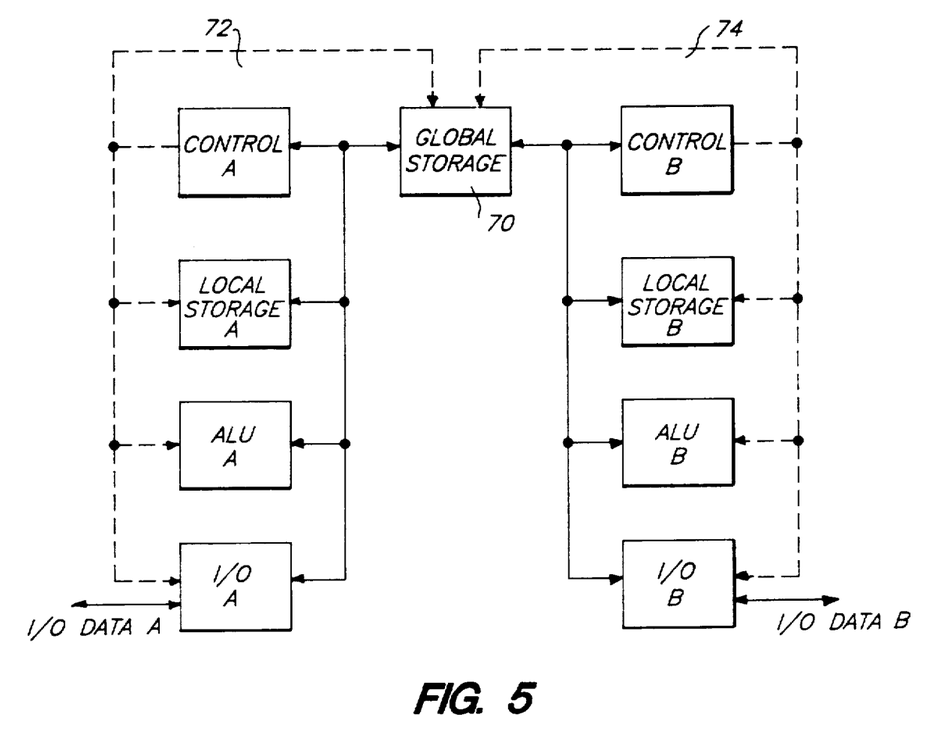
FIG. 5 is a block diagram illustrating the use of the address register processor system of the present invention as a global memory.

The dual porting features of the ARP 70 are extended to a multiprocessing environment, as shown in FIG. 5. The block diagram actually illustrates a distributed processing system, one not necessarily restricted to graphics application, but one where intercommunication between processes consist of large data sets. The ARP 70, in this role, acts as a global memory, allowing each attached processor 72 or 74 to operate asynchronous to each other and to the ARP 70 itself. The architecture of the ARP 70 inherently solves many problems associated with multiporting, and does so with the minimum of port arbitration overhead for the applications referred to above.

It is important to consider the improvement of memory performance of the present invention. The basic perameters related to memory performance are: (1) size of data operand (memory width); (2) amount of storage (memory depth); and (3) data transfer rate (bandwidth).

The width of a memory architecture is the size of the largest data operand obtainable in a single cycle. For a normal memory structure, the width is equal to the number of data lines in each independent segment of the array. In the ARP architecture, the actual memory array width is defined as follows:

$$Wa = Wp/N \qquad (1)$$

where:
Wa = Apparent memory width
Wp = Physical memory width
N = Queue size

This relationship requires the physical ARP memory data bus to contain N times the amount of input/output lines of the individual port width. This factor must be considered during the actual implementation process, in order to address the power management problem of simultaneously accessing large numbers of DRAM.

The depth of a memory architecture pertains to the capacity of the memory relative to its data operand size. A two megabyte array accessible by 16 bit words is one megabyte deep. Knowledge of the memory depth allows instant insight into the possible physical array configuration based on known memory technology limits. The depth (D) will always be in multiple of the chip density used. If D exceeds the chip density, the chips are accessed in banks, with D equalling the aggregate depth of the individual banks.

In the case of the ARP architecture, the memory array width does not equal the data operand width. Therefore, the apparent depth of the memory becomes:

$$Da = N \times Dp \qquad (2)$$

where:
Da = Apparent depth
Dp = Physical depth
N = Queue size

Because the apparent depth exceeds the physical array depth, banking of IC's can be avoided in some cases, while maintaining memory depths beyond current technology limits. For example: an ARP memory using a sixteen element queue, and 256K by 1 bit DRAM's, achieve an apparent depth of 4 Mbits for each bit of its width without using memory banking.

The bandwidth of a bus channel is defined as the maximum continuous physical data transfer rate possible between a transmitting and receiving module over the same channel. The bandwidth can be measured in either bits/second, or can be normalized to a particular data operand size by dividing the bits/second quantity by the data size in bits. When applied to memory structures, the use of normalized bandwidths assures a more conservative analysis, since the bandwidth number pertains to actual data transfer rate limits, rather than inflated bits/second rates which may be achievable only under special case (multiple bit wide) transfers.

The following perameters are used to analyze the bandwidth limits of the address register processor:

1. N = The total number of locations within the port queue 30. This parameter will be considered a constant for all ports attached to the ARP.
2. m = The number of queue locations participating in a memory cycle transfer.
3. Bm = The normalized bandwidth of the physical memory array. This parameter is equal to the memory cycle rate achievable by the ARP's memory controller.
4. Bc = The bandwidth of the ARP's microsequencer or hardware controller. This constant determines the maximum rate at which control functions can be executed.

5. Bp=The normalized bandwidth of the attached port. Bp can be assigned to a single port or can be considered as the aggregate bandwidth of several ports, all with common characteristics. This parameter identifies the throughput capacity of the ARP from a system standpoint.

6. Be=The effective bandwidth of the attached port. During partial queue usage modes, some implementations may require extra port transfers to maintain the data queue. In this case, Be is a measure of the useful data transfer rate, neglecting the queue maintenance cycle.

An ARP architecture has, by definition of its N word wide memory data path, a maximum bandwidth capacity of:

$$Bp = N \times Bm \quad (3)$$

Every memory cycle accesses N words of useful information. The actual usable port bandwidth depends on whether the destination or source port can use all N words, and if the address generation section can sequence at the maximum cycle rate of the memory array (Bm). To achieve this bandwidth, all ports must read and/or write contiguous data in sets of N words, and must utilize addressing instructions which are executable within the actual memory cycle times of each service request.

Although the above conditions may be satisfactory for an attached resource such a CRT refresh generator 62 (as in FIG. 4), more general applications require a greater degree of randomness both in the data set size, and in the service routine complexity. An attached CPU, for example, may perform a significant number of single word transfers in addition to spurts of sequential direct memory access (DMA's).

The effect of random access and addressing complexity can be incorporated into the fundamental bandwidth equation as follows:

$$Be = (N \times Bm) \times \frac{m}{N} \times \frac{1}{d} \times \frac{1}{a} = \frac{m \times Bm}{d \times a} \quad (4)$$

where:
N×Bm=Maximum bandwidth available from the memory array
m/N =Usage ratio of the data queue (1<m<N)
d =Data flow derating factor (1<d)
a =address generation derating factor (1<a)
Rewriting the equation in terms of port bandwidth requirements:

$$Bm = \frac{d \times a \times Be}{m} \quad (5)$$

Since the ARP architecture accomplishes port arbitration and switching without bandwidth overhead, the above relationship can be expressed as the summation of independent terms:

$$Bm = bm_1 + bm_2 \ldots bm_q = \sum_{j=1}^{q} bm_j = \sum_{j=1}^{q} \left( \frac{d \times a \times be}{m} \right)_j \quad (6)$$

where each term refers to combinations of d, a, m, and be pertinent to a specific port, specific, instruction type, etc. Since the necessary port bandwidth (be) and the queue usage (m) are, in general, application driven, only the parameters d and a need to be determined in order to access the PAM's bandwidth capability.

The parameter d measures the efficiency of the port data transfer mechanism, particularly under partial queue usage conditions. In general, d is a function of the design chosen to handle partial queue accesses as well as a function of the following parameters:

$$d_j = \frac{bp}{be_j} j = f(m, N, Bc) \text{ where } d > 1 \quad (7)$$

The particular derivation of d concerns compatibility issues between the port's channel bandwidth and the memory array's bandwidth at the point where they interact, the port queue. These issues become particularly important when the port is used in a particular queue usage mode (m<N), since the architecture must deal with invalid queue locations during memory writes and port data reads.

Although the possibilities are endless, the following three partial queue handling implementations are practical:

1. Option I—When extra hardware needs to be avoided, or when the amount of partial queue transfers is very small, partial transfers can be handled entirely within the attached port resource, thereby allowing the apparent queue usage to be 100% at all times. Since the valid data within a queue transfer could be in any queue location, the attached resource is forced to read either the entire queue (worst case), stripping off the valid data, or in the case of write operations, read the queue, edit the locations to be modified, and rewrite the entire queue. For reads, d becomes:

$$d = N/m \quad (8)$$

since the worst case position of valid data requires N transfers for every m data retrievals. For writes:

$$d = \frac{2 \times N}{m} \quad (9)$$

since the port essentially performs a read/modify/write cycle using the queue, a highly inefficient process for large queue sizes.

2. Option II—A modification of option I which removes much of the queue editing responsibilities from the attached resource, requires the address generation unit to decode the port's instruction, determine the position of valid data within the queue, and internally perform the requisite shifts. Such a mechanism, while not necessarily using additional memory array bandwidth (Bm), does use port bandwidth (Bp) because of the time involved for the queue to shift to its proper position. This time, time translates into wasted port bandwidth, making d:

$$d_j = \frac{m + (N - m) \times bp/Bc}{m} j = 1 + \frac{(N - m) \times bp}{m \times Bc} j \quad (10)$$

Because Bc is normally a constant for a particular architecture, the efficiency of this method is inversely proportional to the port bandwidth, making it a poor choice for applications where bp>Bc.

Unlike option I, the worst case performance of option II is equivalent for write and read transfers. In the case of a write operation, the ARP performs both pre-alignment and post-alignment shifts, with the total shifts always equalling N−m, the same as a read transfer with the valid data justified to the first location (furthest away from the output).

3. Option III—A logical extension of option II, this implementation utilizes a barrel shifter between the memory array and the data queue, allowing both pre-alignment and post-alignment to be performed during the memory cycle. This mechanism eliminates all extraneous shifting allowing 100% port bandwidth usage for all data transfers. By definition:

$$d_j = 1 \tag{11}$$

The barrel shifter represents a significant hardware resource to be incorporated into the architecture. However, if the data path is viewed as R one bit elements which are concantenated to achieve the required port resolution (R), the barrel shifter can be implemented as R unique units, each capable of up to a N:1 immediate shift. Such partitioning allows the barrel shifter to be integrated into any VLSI data queue hardware in a straightforward manner.

The parameter a measures the effectiveness of the ARP's address generator in executing port instructions. Since the memory array is under direct control of the address generator, the effect of lengthy or inefficient algorithms translates into lost bandwidth within the memory array itself. Restating the general ARP bandwidth equation:

$$bm_j = \left( \frac{d \times a \times be}{m} \right)_j \tag{12}$$

it can be seen that increases in a result in proportional increases in the amount of memory bandwidth required to support a given port bandwidth.

As in the case of d, a is, in general, a function of the following parameters:

$$a_j = \text{int}[f(m, N, Bc)] \text{ where } a_j > 1 \tag{13}$$

The parameter is limited to integer values of one or greater since any usable data transfer requires at least one memory cycle, and extra processing overhead requiring fractional memory cycles normally wastes the entire cycle, due to hardware sychronization problems.

Determination of a for a specific instruction requires exact knowledge of the instruction's service routine and the parallelism available within theaddress generator. Particularly important to determine are the number of processor cycles required (c), and the number of memory cycles to beperformed on the array itself (e). The actual expression for a then becomes:

$$a_j = \text{int}\left( c_j \times \frac{Bm}{Bc} \right) \text{where, } a_j > e_j \tag{14}$$

In other words, the magnitude of a is equal to the number of processing cycles required, normalized to the memory bandwidth and rounded to the next higher integer quantity. By including any necessary wait states needed to properly synchronize the required memory cycles, a is guaranteed to be within proper bounds.

The present invention drastically reduces the overhead necessary for intertask communications by using a common multiple port memory, one with sufficient bandwidth to support the combined requirements of all the distributed processes. Instead of transferring large data sets between memory segments, only memory pointers need to be communicated, identifying the beginning location of a contiguous block of data. The ARP architecture allows such an implementation by converting the contiguous nature of the large data sets associated with graphics applications into instantaneous bandwidth increases using the video RAM principle of moving multiple contiguous words into or out of a shift register during a single memory cycle. The data in the shift register can then be transferred at a rate well beyond that of the memory array itself. The degree of bandwidth enhancement becomes directly proportional to the contiguous nature of the data, limited finally by the size of the shift register used to temporarily store the data.

The ARP architecture differs from the traditional memory architecture by violating the one-to-one correspondence between address and data operands. Instead, the ARP utilizes a concept which identifies dynamically ordered sets of data according to a sequence of addressing instructions. The traditional memory transfer becomes a subset of a more general approach which can support large data transfers with little or no detailed addressing information supplied by the requesting source.

The increased performance of the ARP system is predicated on the assumption that the attached resource usually accesses memory in a predictable manner, describable and creatable by algorithms composed of a series of low level instructions. Structures such as queues, caches, video buffers, fonts, spoolers, lookup tables, etc. can meet this requirement.

Because the ARP principle depends on sequentially organized data to achieve memory bandwidth multiplication, it performs best during the transfer of large contiguous blocks of memory data. Such conditions are found in video raster buffers, imaging processor memories, memory cache interfaces, and virtual memory buffers (disc or tape drives).

In addition to the usefulness of an ARP in each of the above applications, the multiporting capabilities of the ARP make it an ideal choice when more than one of these applications are present in the same design (i.e. image processor with both the hard disc interface and a video raster buffer). Since the ARP's efficiency is maximized for these diverse applications, the ARP can serve as a global memory, eliminating the need for individual disc and raster physical components.

The foregoing disclosure and description of the invention is illustrative and explanatory thereof, and various changes in the method steps, as well as in the details of the illustrated system may be made within the scope of the appended claims without departing from the true spirit of the invention.

I claim:

1. A digital processing system comprising:
   data input means for producing digital information;
   data queue means connected to said data input means by a data bus, said data queue means for providing a parallel queue of digital data from the input data from said data input means;
   memory array means for storing digital data from said data queue means said memory array means being in controllable asynchronous communication with said data queue means, said memory array means further having a data path width equivalent to the data path width of said data queue means;

memory controller means connected to said data queue means and said memory array means for timing the read/write cycles of said memory array means in response to the sequential state of the addresses of said parallel queue of digital data in said data queue means; and data output means connected by a data bus to said data queue means, said data output means preforming parallel to serial conversion on the output data passing from said parallel data queue.

2. The system of claim 1, wherein said data input means comprises a contiguous block of memory data having partially nonsequential data addresses connected to said data queue means by a plurality of ports; and said data queue means comprises serial to parallel converter means for providing a parallel data queue and write register means for receiving said parallel data when the data addresses are nonsequential and writing said parallel data to said memory array means asynchronously with respect to the digital input means and data queue means.

3. The system of claim 2, each of said plurality of ports being independent from any other of said ports.

4. The system of claim 2, said data input means comprising a video raster buffer.

5. The system of claim 2, said data input means comprising an imaging processor memory.

6. The system of claim 2, said data input means comprising a memory cache interface.

7. The system of claim 1, said data queue means comprising a loadable shift register having a plurality of data paths extending from said data input means, said memory controller, and said data output means.

8. The system of claim 7, said data queue means comprising:

a serial input data path extending from said data bus of said data input means to said shift register;

a serial output data path extending from said shift register to the data bus of said data output means; and parallel input and output paths extending from said shift register to said memory array means and said memory controller means.

9. A method of recording digital information comprising the steps of:

converting input data into serial digital information;

transmitting said serial digital information into parallel sequentially and nonsequentially addressed digital information;

writing said parallel digital information onto a shift register;

determining if the shift register is full and if the parallel digital information ceases being sequentially addressed;

transferring the contents of said shift register onto a write register when the shift register is full or the data address ceases being sequential; and asynchronously transferring the contents of the write register into internal computer memory prior to subsequent transfer of the contents of said shift register to the write register.

10. The method of claim 9, said step of converting input data comprising the steps of:

obtaining a block of image data from a plurality of sources;

transforming said image data into digital data; and transmitting said digital data from said plurality of sources to said serial-to-parallel converter by a plurality of data buses.

11. The method of claim 10, further comprising the step of:

multiplexing said digital data across said plurality of data buses such that said digital data passes as a continuous stream to said shift register.

12. A method of recording and reading out digital information produced from a plurality of sources comprising the steps of:

transmitting digital serial data from each of said plurality of sources to a serial-to-parallel converter;

converting the serial data from each of said plurality of sources into parallel digital information;

writing said parallel digital information onto a shift register until the queue of said shift register is full;

transferring the contents of said shift register onto internal digital memory prior to the filling of a subsequent shift register queue;

storing said parallel digital information in internal memory; and recalling said parallel digital information from internal memory by passing said parallel digital information as serial digital information from said internal memory.

13. The method of claim 12, said step of recalling said parallel digital information comprising the steps of:

reading the desired digital information from internal computer memory;

transferring said desired digital information sequentially from internal memory to a read register;

loading a shift register with the sequential digital information from said read register until the queue of said shift register is full;

transforming said parallel digital information into serial digital information; and transmitting said serial digital information through a plurality of data buses as data output.

14. The method of claim 13, further comprising the step of:

transforming said digital information into a humanly perceivable signal related to the stored data obtained from internal computer memory.

* * * * *